(12) United States Patent
Mykhaylov et al.

(10) Patent No.: US 12,205,135 B2
(45) Date of Patent: *Jan. 21, 2025

(54) REAL-TIME FULLY AUTOMATED INCENTIVE-TO-NEEDS MATCHING AND DELIVERY

(71) Applicant: Mobiry International Inc., Sunnyvale, CA (US)

(72) Inventors: Oleksiy Mykhaylov, Maple Ridge (CA); Oleksiy Ptashniy, Kharkov (UA); Cameron Findlay Morris, Foster City, CA (US)

(73) Assignee: Mobiry Internatonal Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,017

(22) Filed: Sep. 30, 2022

(65) Prior Publication Data

US 2023/0066852 A1    Mar. 2, 2023

Related U.S. Application Data

(63) Continuation of application No. 16/965,966, filed as application No. PCT/US2019/015730 on Jan. 29, 2019, now Pat. No. 11,488,196.

(Continued)

(51) Int. Cl.
*G06Q 30/00* (2023.01)
*G06F 16/23* (2019.01)
(Continued)

(52) U.S. Cl.
CPC ..... *G06Q 30/0238* (2013.01); *G06F 16/2379* (2019.01); *G06F 16/9024* (2019.01);
(Continued)

(58) Field of Classification Search
None
See application file for complete search history.

(56) References Cited

U.S. PATENT DOCUMENTS 6,330,546 B1 * 12/2001 Gopinathan .......... H04M 15/47
  705/38
8,773,437 B1 *  7/2014 Goldman ............ H04L 12/1813
  345/440

(Continued)

FOREIGN PATENT DOCUMENTS

WO    WO-2019148209 A1 *  8/2019 ......... G06F 16/2379

OTHER PUBLICATIONS

Mobasher, Bamshad, et al. "Automatic Personalization Based on Web Usage Mining." Communications of the ACM, vol. 43, No. 8, Aug. 2000. (Year: 2000).*

(Continued)

*Primary Examiner* — Luis A Brown
(74) *Attorney, Agent, or Firm* — Ahmann Kloke LLP

(57) ABSTRACT

Generating an asset ontology. Obtaining current transaction information associated with a current transaction, the current transaction information being obtained in response to the current transaction being processed by a point of sale system. Updating a subscriber profile based on the current transaction information. Selecting one or more subscriber roles based on the updated subscriber profile. Identifying one or more assets based on the one or more subscriber roles and the asset ontology. Selecting one or more incentives based on the one or more assets. Providing the one or more incentives to a subscriber system, thereby causing the subscriber system to present the one or more incentives at substantially the same time as the current transaction is processed by the point of sale system.

20 Claims, 12 Drawing Sheets

Related U.S. Application Data

(60) Provisional application No. 62/623,489, filed on Jan. 29, 2018.

(51) Int. Cl.
  *G06F 16/901* (2019.01)
  *G06Q 20/12* (2012.01)
  *G06Q 20/20* (2012.01)
  *G06Q 30/0207* (2023.01)
  *G06Q 30/0211* (2023.01)
  *G06Q 30/0238* (2023.01)

(52) U.S. Cl.
  CPC ......... *G06Q 20/127* (2013.01); *G06Q 20/202* (2013.01); *G06Q 30/0211* (2013.01); *G06Q 30/0236* (2013.01)

(56) References Cited

U.S. PATENT DOCUMENTS

| | | | | |
|---|---|---|---|---|
| 9,788,777 | B1* | 10/2017 | Knight | G06Q 30/0269 |
| 2007/0038516 | A1* | 2/2007 | Apple | G06Q 30/02 |
| | | | | 705/14.42 |
| 2008/0033784 | A1* | 2/2008 | Chalimadugu | G06Q 30/0277 |
| | | | | 705/7.29 |
| 2012/0158503 | A1* | 6/2012 | Mardikar | G06Q 30/0255 |
| | | | | 705/14.66 |
| 2013/0218887 | A1* | 8/2013 | Yildiz | G06F 15/16 |
| | | | | 707/736 |
| 2014/0006129 | A1* | 1/2014 | Heath | G06Q 30/02 |
| | | | | 705/14.23 |
| 2014/0052527 | A1* | 2/2014 | Roundtree | G06Q 30/0245 |
| | | | | 705/14.44 |
| 2014/0278974 | A1* | 9/2014 | Standish | G06Q 50/01 |
| | | | | 705/14.53 |
| 2015/0095205 | A1* | 4/2015 | Hebner | G06Q 20/405 |
| | | | | 705/31 |
| 2015/0186920 | A1* | 7/2015 | Sayler | G06Q 30/0239 |
| | | | | 705/14.39 |
| 2015/0220985 | A1* | 8/2015 | Mardikar | G06Q 30/0255 |
| | | | | 705/14.53 |
| 2016/0019595 | A1* | 1/2016 | Wu | G06Q 30/0224 |
| | | | | 705/14.66 |
| 2016/0048860 | A1* | 2/2016 | Sayler | G06Q 30/0267 |
| | | | | 705/14.64 |
| 2016/0314528 | A1* | 10/2016 | Abbott | G06Q 30/0269 |
| 2017/0277803 | A1* | 9/2017 | Zimmerman | G06F 16/9535 |
| 2018/0137500 | A1* | 5/2018 | Greene | G06Q 20/387 |
| 2018/0189859 | A1* | 7/2018 | Campos | H04L 63/0815 |
| 2018/0197200 | A1* | 7/2018 | Zoldi | G06Q 30/0255 |
| 2019/0066140 | A1* | 2/2019 | Mani | G06Q 10/067 |
| 2019/0114689 | A1* | 4/2019 | Wang | G06Q 30/0631 |
| 2019/0156196 | A1* | 5/2019 | Zoldi | G06N 3/08 |
| 2019/0220893 | A1* | 7/2019 | Mardikar | G06Q 30/0255 |
| 2019/0230163 | A1* | 7/2019 | Chavez | H04W 4/21 |
| 2020/0160381 | A1* | 5/2020 | Nagar | G06F 40/279 |
| 2020/0294094 | A1* | 9/2020 | Brock | G06Q 30/0271 |
| 2020/0357012 | A1* | 11/2020 | Kendall | G06Q 20/3433 |
| 2021/0042782 | A1* | 2/2021 | Mykhaylov | G06Q 40/02 |
| 2021/0097546 | A1* | 4/2021 | Adjaoute | G06Q 30/0201 |
| 2021/0233111 | A1* | 7/2021 | Mardikar | G06Q 30/0269 |
| 2022/0044261 | A1* | 2/2022 | Jumper | G06N 20/00 |
| 2022/0253900 | A1* | 8/2022 | Mardikar | G06Q 30/0269 |

OTHER PUBLICATIONS

Gauch, Susan, et al. "User Profiles for Personalized Information Access." The Adaptive Web, LNCS 4321, pp. 54-89, 2007. (Year: 2007).*

Mobasher, Bamshad, et al. "Discovery and Evaluation of Aggregate Usage Profiles for Web Personalization." Data Mining and Knowledge Discovery, vol. 6, pp. 61-82, 2002. (Year: 2002).*

International Application No. PCT/US2019/015730, International Search Report and Written Opinion dated Aug. 1, 2019.

* cited by examiner

REAL-TIME FULLY AUTOMATED INCENTIVE-TO-NEEDS MATCHING AND DELIVERY

CROSS-REFERENCE TO RELATED APPLICATIONS

This application is a continuation to Ser. No. 16/965,966 filed Jul. 29, 2020, which is a national phase application pursuant to 35 U.S.C. § 371 of International Application No. PCT/US2019/015730 filed Jan. 29, 2019, which claims priority to U.S. Provisional Patent Application Ser. No. 62/623,489 filed Jan. 29, 2018, the disclosures of which are incorporated by reference herein.

DETAILED DESCRIPTION

Figure 1:
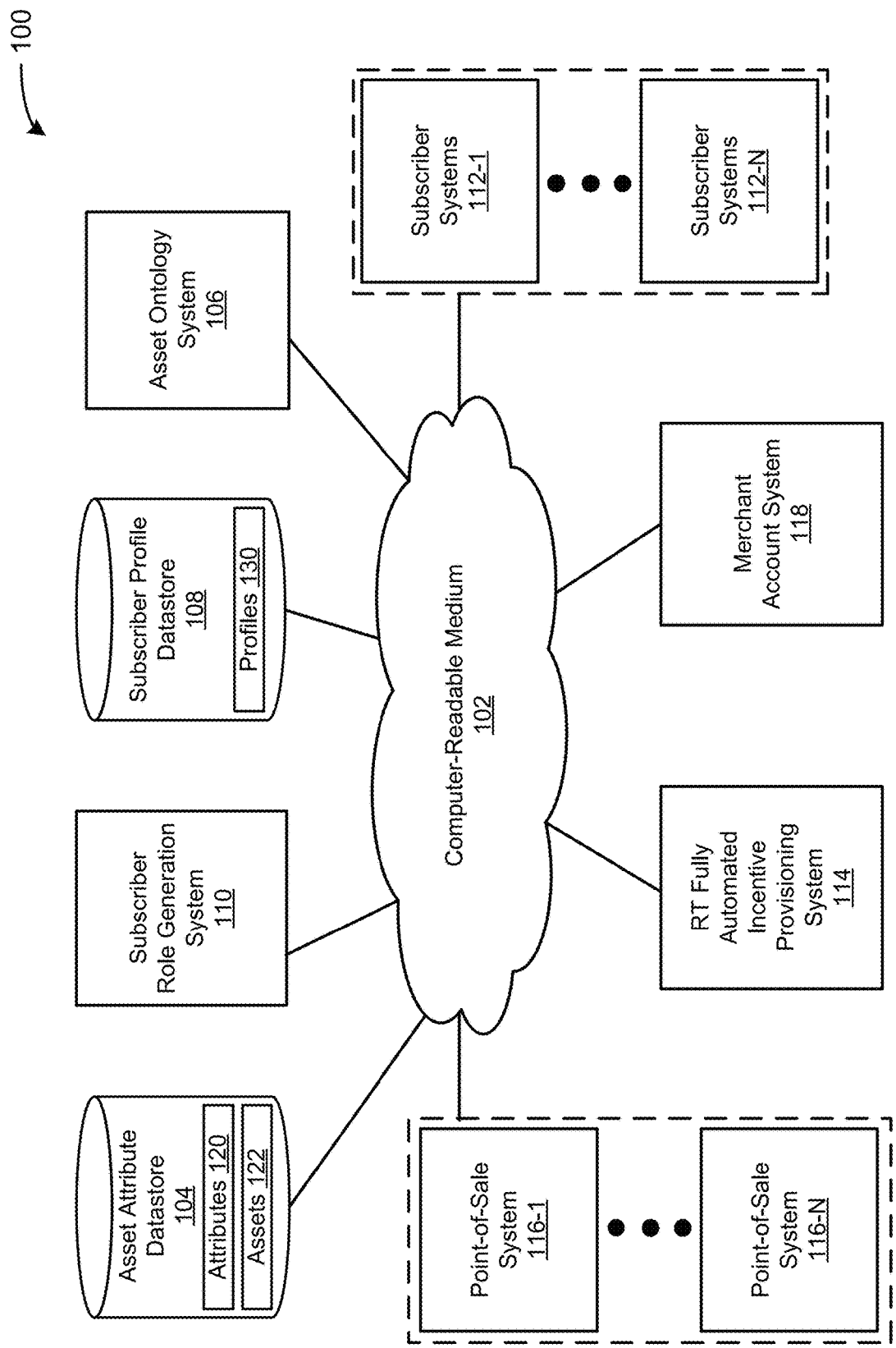
FIG. 1 depicts a diagram of an example of a system for providing real-time fully automated incentive-to-needs matching and delivery.

FIG. 1 shows a diagram 100 of an example system for providing real-time fully automated incentive-to-needs matching and delivery. The diagram 100 includes a computer-readable medium 102, an asset attribute datastore 104, an asset ontology system 106, a subscriber profile datastore 108, a subscriber role generation system 110, subscriber systems 112-1 to 112-n (individually, the subscriber system 112, collectively, the subscriber systems 112), a real-time fully automated incentive provisioning system 114, point-of-sale systems 116-1 to 116-n (individually, the point-of-sale system 116, collectively, the point-of-sale systems 116), and the merchant account system 118.

In the example system shown in FIG. 1, the asset attribute datastore 104, the asset ontology system 106, the subscriber profile datastore 108, the subscriber role generation system 110, the subscriber systems 112, the real-time fully automated incentive provisioning system 114, the point-of-sale systems 116, and the merchant account system 118 are coupled to the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102 and other applicable systems or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other (I/O) devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, Ethernet interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some implementations, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Referring once again to the example of FIG. 1, the asset attribute datastore 104 functions to provide create, read, update, and delete (or, "CRUD") functionality for asset attributes 120 and assets 122, as well as maintain a repository of asset attributes 120 and/or assets 122. Asset attributes 120 can be associated with assets 122, such as products (e.g., an iPhone mobile device), services (e.g., a car wash), events (e.g., a music concert or a location at a specific time), and any other asset that can be associated with an incentive. As used herein, an incentive can include a promotional offer, such as a coupon, or other redeemable offer. In a specific implementation, asset attributes 120 can include some or all of the following:

Asset Identifier(s): asset identifiers can include a SKU value, a UPC value, and the like. In a specific implementation, the SKU value is unique to a merchant, and/or merchant location (e.g., a particular merchant store).

Asset Name: a name of the asset (e.g., iPhone 6).

Asset Categories: one or more asset categories, e.g., product, service, and event.

Type(s) of Asset: type of asset can include, for example, "high margin," "low margin," or "need to sell."

Available Incentives Types: types incentives available for the asset, e.g., "2 for 1" incentives, discount incentives, and gamification incentives.

Maximum Discount: a maximum discount (e.g., a percentage or dollar amount) that can be associated with the asset.

In a specific implementation, asset attributes values are obtained manually (e.g., from a merchant) and/or automatically (e.g., from different point-of-sale systems).

In the example of FIG. 1, the asset ontology system 106 functions to identify one more assets that can be associated with an incentive. In a specific implementation, the asset ontology system 106 generates and stores an asset ontology represented by, and/or comprising, a weighted node graph. For example, each node can be associated with an asset, a person, a location, a physical description, and the like. Related nodes of the graph can be connected by weighted edges (e.g., the stronger the relationship between nodes, the greater the weight). In a specific implementation, there are multiple types of nodes, such as an "asset" node type and a "non-asset" node type. For example, an asset node type represents an asset (e.g., iPhone 6), and a non-asset node type informs the identification of the one or more assets. For example, a non-asset node "baseball player" may be linked by a weighted edge to an asset node "baseball glove."

In a specific implementation, the asset ontology is initially generated from seed values (e.g., asset attributes). In various implementations, the initial asset ontology may or may not include any links (or, "edges"). The asset ontology can be progressively updated based on logged transactions and other data to create new nodes and links, and adjust link weights.

In the example of FIG. 1, the subscriber profile datastore 108 functions to provide create, read, update, and delete (or, "CRUD") functionality for subscriber profiles 130, as well as maintain a repository of subscriber profiles 130. Subscriber profiles 130 can include a variety of subscriber profile attributes, such as geographic attributes, demographic attributes, psychographic attributes, behavioristic attributes, and other data that may be used to identify, select, and/or predict incentives that may be of interest to a subscriber or group of subscribers. In a specific implementation, subscriber profiles 130 can include some or all of the following attributes:

Subscriber Profile Identifier: an identifier of the of the subscriber profile, e.g., a UID, and/or one or more of the other subscriber profile attributes (e.g., phone number).
Phone Number
First Name
Gender
Physical Address
Email Address
Current Geographic Location
Historical Geographic Locations
Purchase History
Incentive Redemption History
Social Media Accounts
Income Level
Marital Status
Household Size
Children
Education
Special Characteristics
Food Preferences
Typical Desired Frequency of Marketing
Desired frequency of marketing for particular merchants
Subscriber role(s) that may be assigned to the subscriber (e.g., socializer, bargain hunter, etc.).
Subscriber role(s) assigned to the subscriber
Privacy: subscriber can select attributes that may be available to other entities (e.g., merchants). For example, an access control list (ACL) can govern privacy.

In a specific implementation, the subscriber profile initially includes just a phone number, and additional attributes can subsequently be included. In a specific implementation, some or all of the subscriber profile attributes are accessible by the subscriber and cannot be changed and/or accessed by other entities (e.g., merchants).

In various implementation, some or all subscriber profile attributes can be shared with other entities. In a specific implementation, the exact values are not shared, but rather generalized, or "anonymized," values are shared. For example, a value of "Lives close" can be shared instead of an actual physical address.

In the example of FIG. 1, the subscriber role generation system 110 functions to create subscriber roles and/or maintain a repository of subscriber roles. In a specific implementation, subscriber roles define groups of related subscriber profiles 130, although in other implementations, subscriber roles can be unique to individual subscriber profiles 130. For example, subscriber profiles 130 can be related based upon corresponding needs, e.g., as identified based on some or all subscriber profile attributes. Subscriber roles can include a variety of attributes, such as geographic attributes, demographic attributes, psychographic attributes, behavioristic attributes, and other attributes that may be used to identify, select, and/or predict incentives that may be of interest to a subscriber or group of subscribers. In a specific implementation, subscriber roles can include some or all of the following attributes:

Subscriber Role Identifier: identifies the subscriber role, e.g., "Bargain Hunter," "Socializer," and/or other human-understandable identifiers.
Geographic Location
Education
Income Level
Marital Status
Special characteristics (e.g., children, pets, hobbies, interests, etc.)
Purchase Tendencies (e.g., spending amounts, shopping locations, etc.)
Incentive Redemption Tendencies (e.g., rarely redeems incentives less provide less than 10% off, but frequently redeems incentives greater than 10% off).

In a specific implementation, the subscriber roles comprise a predetermined set of subscriber roles. For example, an administrator can define the subscriber roles. In other implementations, the subscriber roles can be dynamically generated. For example, if a threshold number of subscriber profiles 130 have similar values for a particular set of subscriber profile attributes, a subscriber role can be created based on those subscriber profiles 130.

In the example of FIG. 1, the subscriber systems 112 function to present incentives and receive input related to incentives (e.g., redeeming or rejecting an incentive). For example, the subscriber systems 112 can include a graphical user interface for presenting incentives and receiving input, and can be implemented by one or more computing devices such as smartphones, cell phones, smartwatches, laptop computers, tablet computers, or other computing devices.

In the example of FIG. 1, the real-time fully automated incentive provisioning system 114 functions to match incentives to subscriber profiles 130 and/or subscriber roles, select or generate incentives based on matches, and deliver incentives for presentation to a corresponding subscriber. In a specific implementation, incentives are provided in real-time in response to a point-of-sale transaction. For example, if a subscriber purchases a hamburger at Shake Shack, the real-time fully automated incentive provisioning system 114 can identify incentives based on that transaction, as well as any associated subscriber roles, and deliver the incentive within a predetermined amount time (e.g., one minute) after the transaction occurred.

In a specific implementation, the real-time fully automated incentive provisioning system 114 functions to determine incentive campaign results. For example, the real-time fully automated incentive provisioning system 114 can function to track which incentives were redeemed, which incentives were rejected or ignored, any revenue generated (or lost) based on the incentive campaign, and the like. In various implementations, the real-time fully automated incentive provisioning system 114 functions to adjust incentive campaign attributes (e.g., duration of incentive campaign, number of available incentives, subscriber roles to target in the campaign, assets available for association with incentives, etc.) based on campaign results. In some implementations, the incentive campaign may be adjusted manually (e.g., in response to user input), and/or automatically (e.g., based on one or incentive campaign rules).

In the example of FIG. 1, the point-of-sale systems 116 function to process transactions (e.g., purchases), log associated transaction information (e.g., time of the transaction, amount the of the transaction, etc.), and transmit transaction information. For example, the point of sale system 116 may be a Verifone point of sale system. It will be appreciated that some or all of the functionality of the systems described herein can be incorporated into the point of sale systems 116 (e.g., via API or directly installed on the point of sale system 116).

In the example of FIG. 1, the merchant account system 118 functions to administer and present information associated with incentive campaigns. For example, the merchant account system 118 can provide instructions for defining incentive campaign attributes, viewing incentive campaign results, providing instructions for adjusting incentive campaigns, and so forth. In a specific implementation, the merchant account system 118 can be implemented by one or more computing devices such as smartphones, cell phones, smartwatches, laptop computers, tablet computers, or other computing devices.

In various implementations, the system of FIG. 1 provides a fully automated coupon and fulfillment service, and delivers incentives through social media and digital marketing channels direct to subscribers based on their buying habits and spending history. In a specific implementation, purchase and other transaction information are logged and tracked at point-of-sale. For example, purchase and other transaction information can include the date, time, location and/or dollar value of all transactions linked to the subscriber's profile, which can provide evolving comprehensive data on their individual shopping preferences. In various implementations, making some or all offers unique and relevant to a subscriber's "purchase drivers," e.g., based on their specific wants and needs, can lead to increased brand value and subscriber retention.

Figure 2:
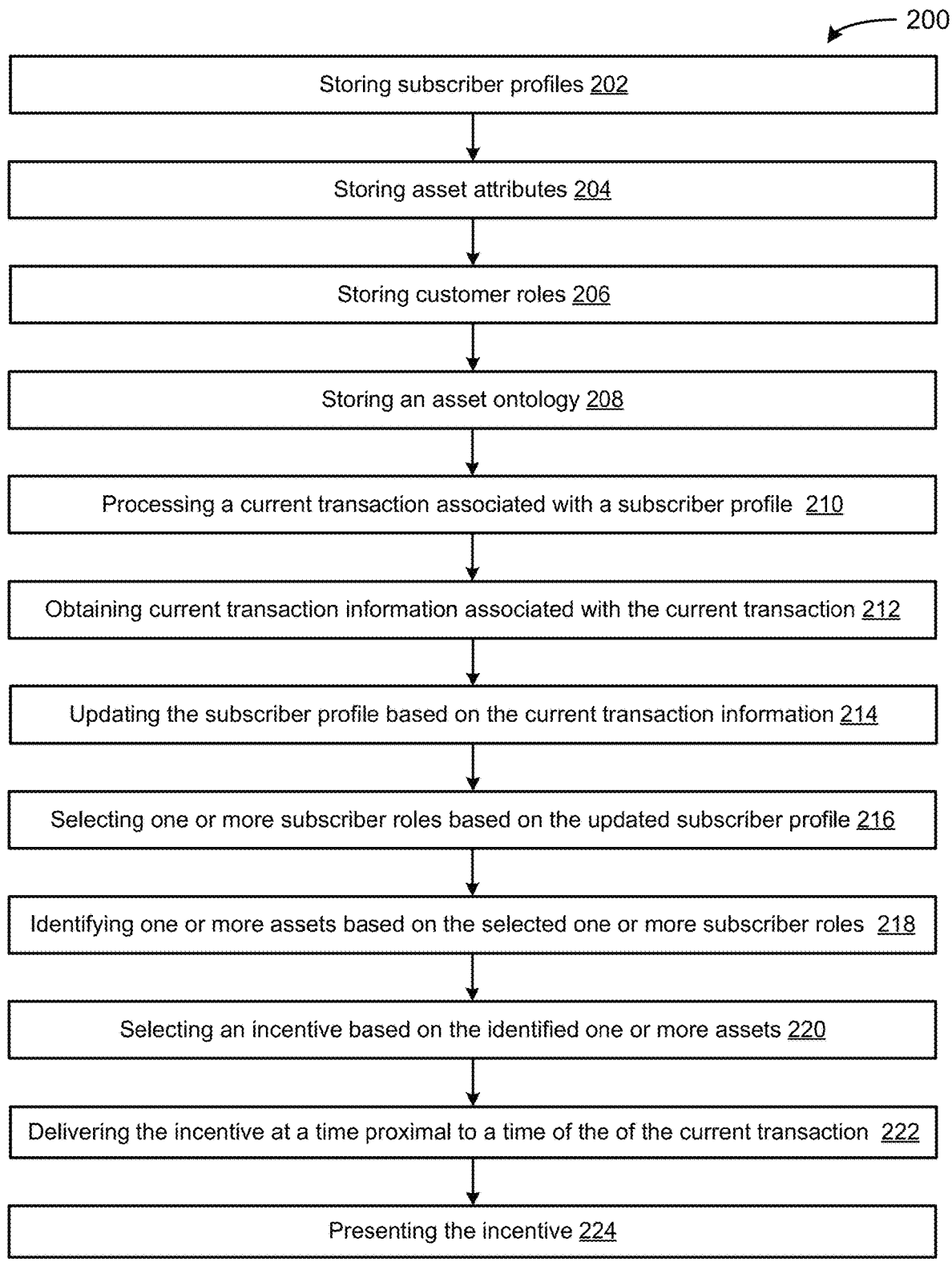
FIG. 2 depicts a flowchart of an example method for providing real-time fully automated incentive-to-needs matching and delivery.

FIG. 2 depicts a flowchart 200 of an example method for providing real-time fully automated incentive-to-needs matching and delivery. In this and other flowcharts described in this paper, the flowchart illustrates by way of example a sequence of modules. It should be understood the modules can be reorganized for parallel execution, or reordered, as applicable. Moreover, some modules that could have been included may have been removed to avoid providing too much information for the sake of clarity and some modules that were included could be removed, but may have been included for the sake of illustrative clarity.

In the example of FIG. 2, the flowchart 200 starts at module 202 where a subscriber profile datastore stores subscriber profile attribute value pairs. In a specific implementation, the subscriber profile datastore obtains subscriber profile attribute values from one or more sources. For example, the one or more sources can include point-of-sale systems, subscriber systems, merchant account systems, and the like.

In the example of FIG. 2, the flowchart 200 continues to module 204 where an asset attribute datastore stores asset attribute value pairs. In a specific implementation, the asset attribute datastore obtains the asset attribute values from one or more sources. For example, the sources can include point-of-sale systems, merchant account systems, subscriber systems, and the like.

In the example of FIG. 2, the flowchart 200 continues to module 206 where a subscriber role datastore stores subscriber roles. In a specific implementation, the subscriber roles can include a set of predetermined subscriber roles, although in other implementations, the subscriber roles can be dynamically generated.

In the example of FIG. 2, the flowchart 200 continues to module 208 where an asset ontology system stores an asset ontology. For example, the asset ontology can comprise a asset ontology weighted node graph.

In the example of FIG. 2, the flowchart 200 continues to module 210 where a point-of-sale system processes a current (or, "real-time") transaction of a subscriber. For example, the current transaction can be a food purchase at a particular merchant location.

In the example of FIG. 2, the flowchart 200 continues to module 212 where the subscriber profile datastore obtains the current transaction information associated with the current transaction. For example, the current transaction information can include a location of the transaction, a time of the transaction, an amount of the transaction, a type of the transaction, an asset identifier of the transaction, and the like. In various implementations, the subscriber profile datastore can obtain the current transaction information from one or more sources. For example, the one or more sources can include point-of-sale systems, subscriber systems, merchant account systems, and the like.

In the example of FIG. 2, the flowchart 200 continues to module 214 where the subscriber profile datastore updates (e.g., performs one or more CRUD operations) at least one of the subscriber attribute values of a subscriber profile associated with the subscriber. In a specific implementation, the update is performed based on the current transaction information.

In the example of FIG. 2, the flowchart 200 continues to module 216 where a real-time fully automated incentive provisioning system selects one or more subscriber roles based on at least a portion of the subscriber profile attribute values of the subscriber profile.

In the example of FIG. 2, the flowchart 200 continues to module 218 where an asset ontology system identifies one or more assets for association with an incentive. In a specific implementation, the identification is based on the one or more subscriber roles and an asset ontology graph stored by the asset ontology system. For example, the asset ontology system may receive the one or more subscriber roles (or, one or more attributes thereof) as input values, traverse the graph based on the input values, and identify the one or more assets for association with the incentive based on the traversal.

In the example of FIG. 2, the flowchart 200 continues to module 220 where the real-time fully automated incentive provisioning system selects an incentive based on the one or more identified assets. For example, the real-time fully automated incentive provisioning system can select the incentive from a predetermined set of incentives, or generate a new incentive.

In the example of FIG. 2, the flowchart 200 continues to module 222 where the real-time fully automated incentive provisioning system delivers the incentive for presentation to a subscriber. For example, the real-time fully automated incentive provisioning system can deliver the incentive via SMS message, iMessage, social media (e.g., Twitter, Facebook, SnapChat, etc.), and the like.

In the example of FIG. 2, the flowchart 200 continues to module 224 where a subscriber system presents the incentive. For example, the incentive can be presented through a graphical user interface of the subscriber system.

Figure 3:
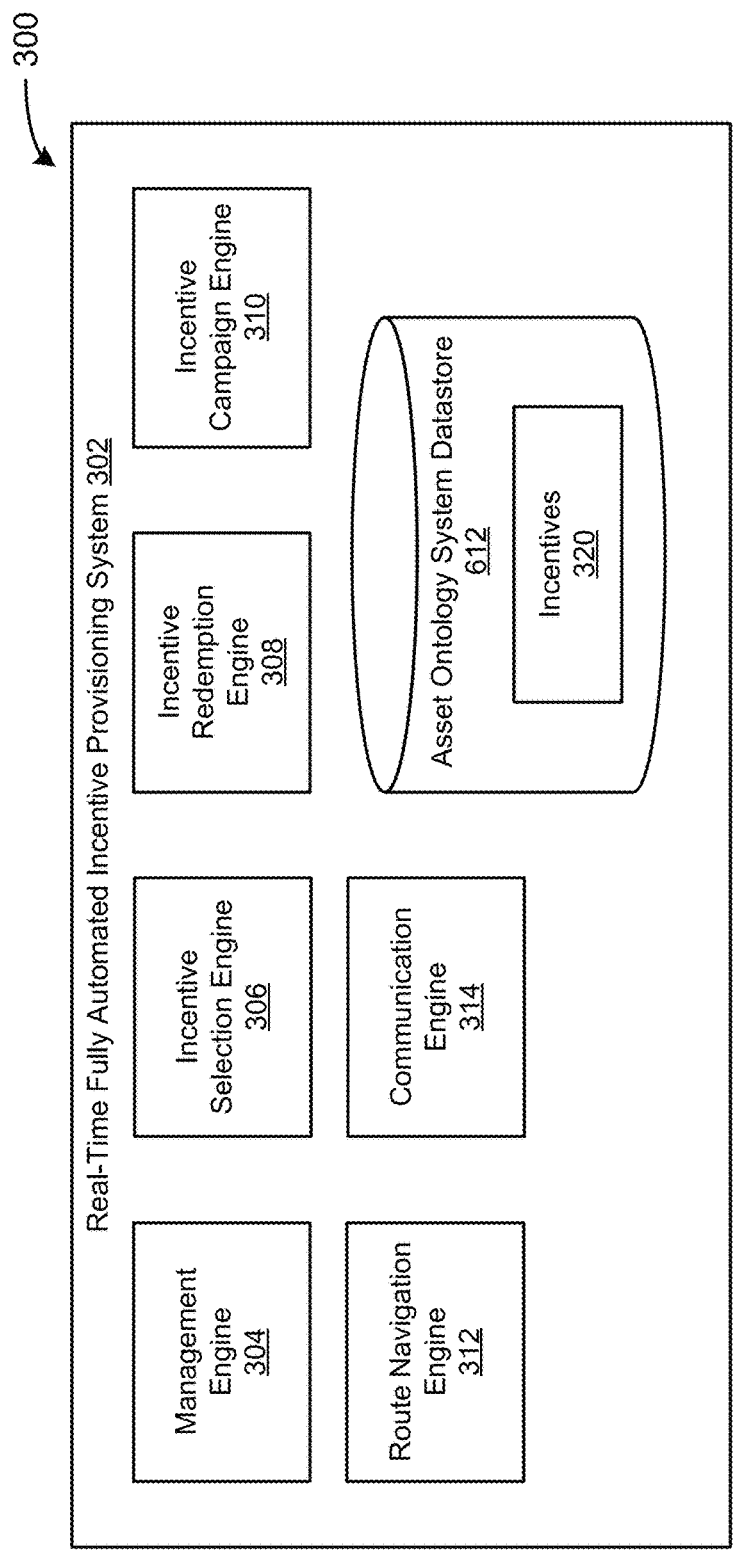
FIG. 3 depicts a diagram of an example of a real-time fully automated incentive provisioning system.

FIG. 3 depicts a diagram 300 of an example of a real-time fully automated incentive provisioning system 302. The real-time fully automated incentive provisioning system 302 includes a management engine 304, an incentive selection engine 306, an incentive redemption engine 308, an incentive campaign engine 310, a route navigation engine 312, a communication engine 314, and a real-time fully automated incentive provisioning system datastore 316.

In the example of FIG. 3, the management engine 304 functions to manage (e.g., create, read, update, delete, or otherwise access) incentives 320. The management engine 304 may perform any of these operations manually (e.g., by a user interacting with a GUI) and/or automatically (e.g., triggered by one or more of the engines 306-314). Like other engines described herein, some or all of the functionality of the management engine 304 may be included in and/or cooperate with one or more other engines (e.g., engines 306-314).

In the example of FIG. 3, the incentive selection engine 306 functions to identify and/or select one or more incentives 320. For example, the incentive selection engine 306 may select one or more incentives 320 that match one or more assets. Incentives 620 may be selected from a predetermined set of incentives and/or dynamically generated. For example, if an identified asset does not have an appropriate incentive, an incentive can be generated based on an associated user role and/or the asset ontology 320 (e.g., an incentive associated with a nearest neighbor node).

In the example of FIG. 3, the incentive redemption engine 308 functions to determine whether an incentive 320 has been redeemed, when it was redeemed, a subscriber that redeemed the incentive, and/or the like. For example, the incentive redemption engine 308 can manually or automatically determine whether an incentive has been redeemed. For example, the incentive 320 may include instructions to notify the incentive redemption engine 308 of a redemption when the incentive has been redeemed, or notify the incentive redemption engine 308 that the incentive has not been redeemed if has not been redeemed within a predetermined amount of time (e.g., 1 week). In a specific implementation, the incentive redemption engine 308 can batch request the status of set of incentives. For example, an incentive campaign can include a set of incentives, and at the end of the campaign, or other milestone of the campaign, the incentive redemption engine 308 can query a status of each incentives (e.g., redeemed, not redeemed).

In the example of FIG. 3, the incentive campaign engine 310 functions to generate and/or issue incentives as part of an incentive campaign. For example, available incentives may be limited based on a current campaign and/or set of campaigns. In a specific implementation, the incentive campaign engine 310 can monitor and/or collect information associated with a campaign. For example, the incentives that were redeemed, the incentives that were not redeemed, and/or the like Similarly, the incentive campaign engine 308 may determine a result (e.g., success, fail) of a campaign. For example, if a threshold percentage or number of incentives are redeemed, the campaign result can be a success, otherwise it can be a fail.

In the example of FIG. 3, the route navigation engine 312 functions obtain navigation route information (e.g., global positioning information for a vehicle or mobile navigation system). In a specific implementation, the route navigation engine 312 obtains the route information from a subscriber profile stored in a subscriber profile datastore. In other implementations, the route navigation engine 312 obtains the navigation route information from an associated navigation system (e.g., Google Maps, Apple Maps, an automobile navigation system, etc.).

In the example of FIG. 3, the route navigation engine 312 functions to provide instructions to modify the navigation route information to include a waypoint or other destination associated with the incentive. In a specific implementation, the modification is performed in response to a redemption of the incentive.

In the example of FIG. 3, the communication engine 314 to send requests, transmit and, receive communications, and/or otherwise provide communication with one or a plurality of the systems, engines, and/or datastores described herein. In some embodiments, the communication engine 314 functions to encrypt and decrypt communications. The communication engine 314 may function to send requests to and receive data from one or more systems through a network or a portion of a network. Depending upon implementation-specific considerations, the communication engine 314 may send requests and receive data through a connection, all or a portion of which may be a wireless connection. The communication engine 314 may request and receive messages, and/or other communications from associated systems and/or engines. Communications may be stored in the datastore 316. In a specific implementation, the communication engine 314 functions to provide incentives. For example, the communication engine 314 can provides incentives to subscriber systems, social media systems, and/or the like.

Figure 4:
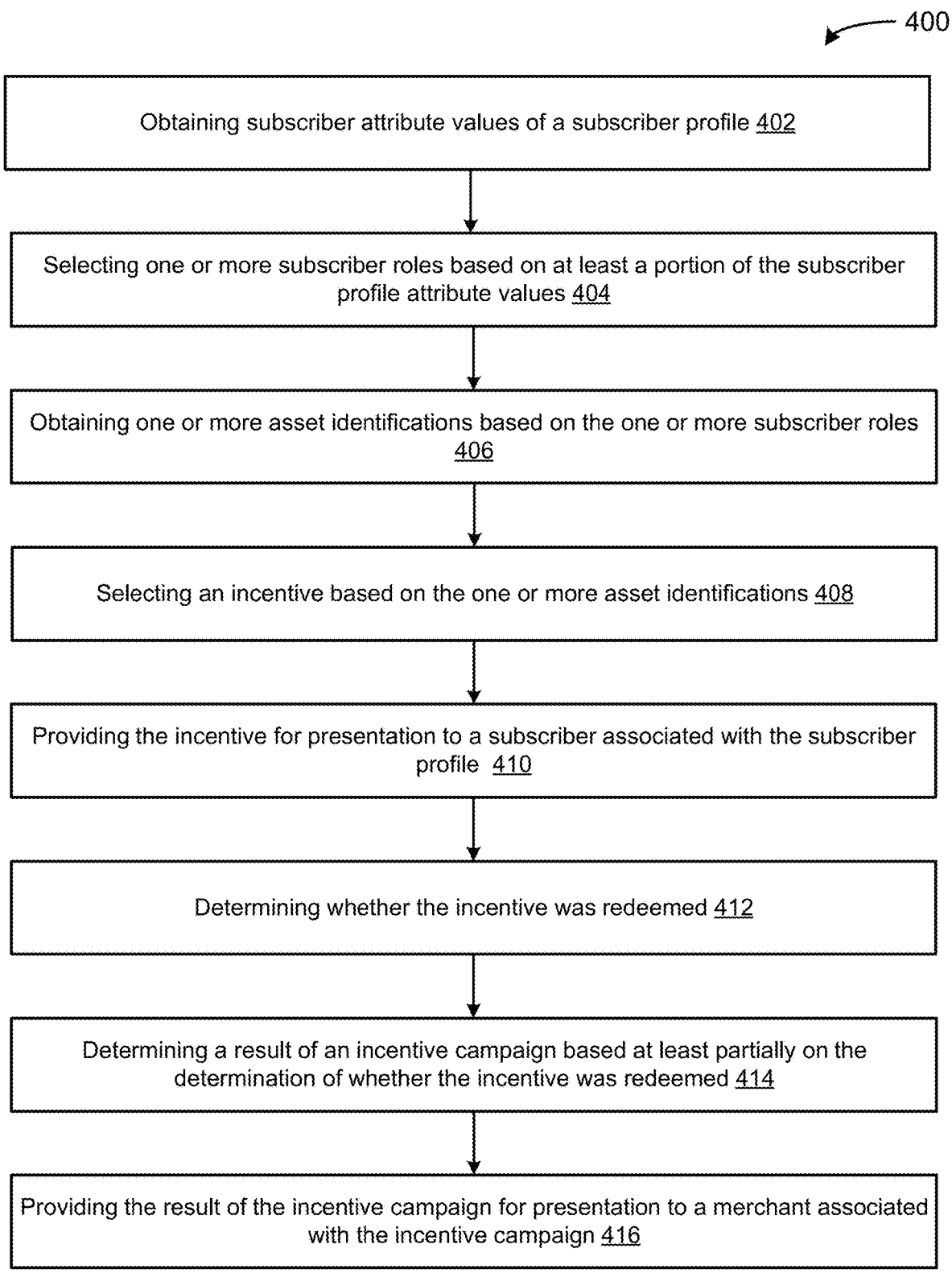
FIG. 4 depicts a flowchart of an example method for providing real-time fully automated incentive-to-needs matching and delivery.

FIG. 4 depicts a flowchart 400 of an example method for providing real-time fully automated incentive-to-needs matching and delivery.

In the example of FIG. 4, the flowchart 400 starts at module 402 where a real-time fully automated incentive provisioning system obtains subscriber attribute values of a subscriber profile. In a specific implementation, the real-time fully automated incentive provisioning system obtains the subscriber attribute values from a subscriber profile datastore.

In the example of FIG. 4, the flowchart 400 continues to module 404 where the real-time fully automated incentive provisioning system selects one or more subscriber roles based on at least a portion of the subscriber attribute values of the subscriber profile. In a specific implementation, the real-time fully automated incentive provisioning system selects the one or more subscriber roles from a set of predetermined subscriber roles stored by a subscriber role generation system In the example of FIG. 4, the flowchart 400 continues to module 406 where the real-time fully automated incentive provisioning system obtains one or more asset identifications. In a specific implementation, the real-time fully automated incentive provisioning system obtains the one or more asset identifications from an asset ontology system.

In the example of FIG. 4, the flowchart 400 continues to module 408 where the real-time fully automated incentive provisioning system selects an incentive based on the one or more asset identifications.

In the example of FIG. 4, the flowchart 400 continues to module 410 where the real-time fully automated incentive provisioning system provides the incentive for presentation to a subscriber.

In the example of FIG. 4, the flowchart 400 continues to module 412 where the real-time fully automated incentive provisioning system determines whether the incentive was redeemed.

In the example of FIG. 4, the flowchart 400 continues to module 414 where the real-time fully automated incentive provisioning system determines a result of an incentive campaign associated with the incentive based at least partially on the determination of whether the incentive was redeemed.

In the example of FIG. 4, the flowchart 400 continues to module 416 where the real-time fully automated incentive provisioning system provides the result of the incentive campaign for presentation to a merchant associated with the incentive campaign.

Figure 5:
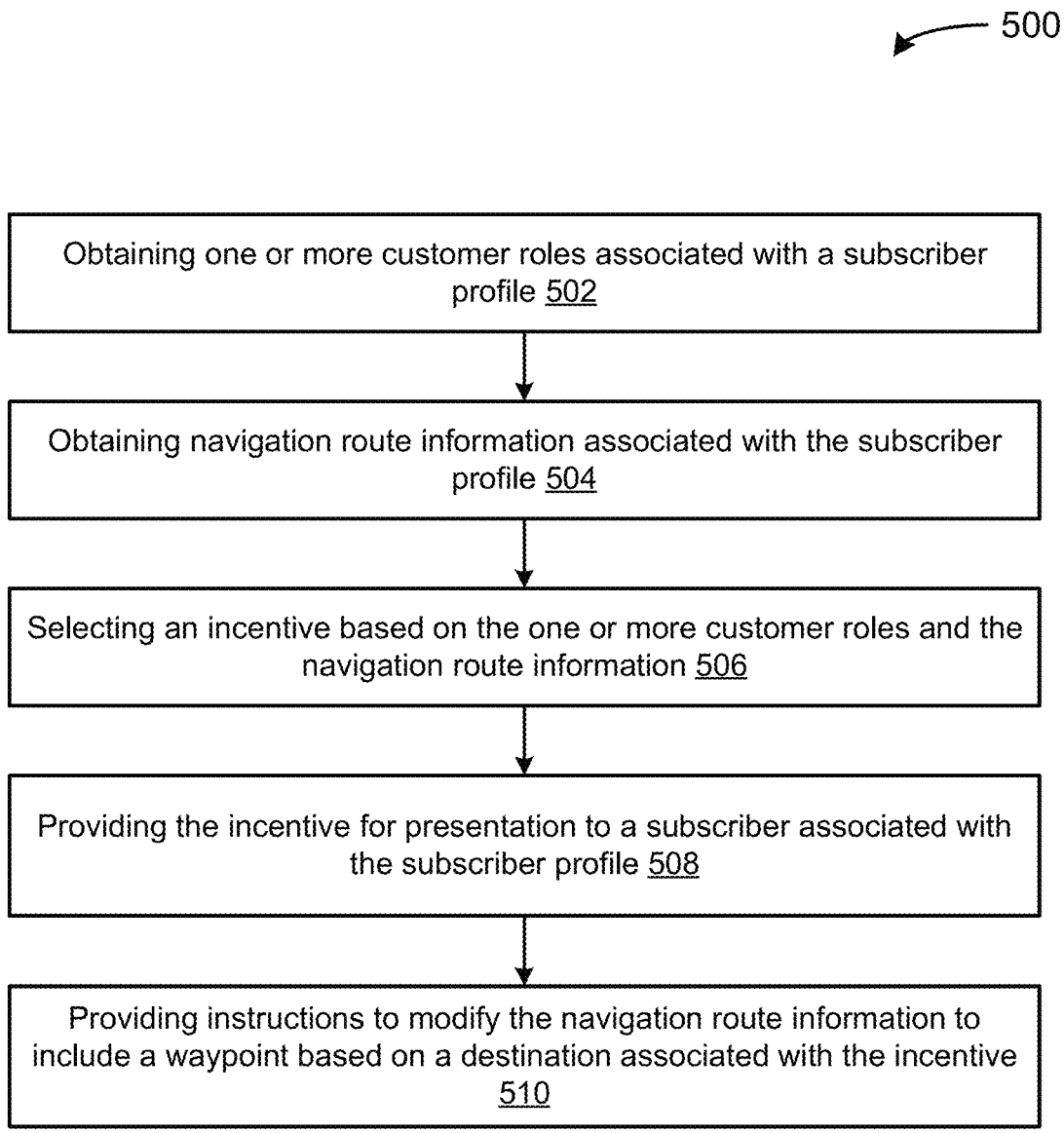
FIG. 5 depicts a flowchart of an example method for providing real-time fully automated incentive-to-needs matching and delivery.

FIG. 5 depicts a flowchart 500 of an example method for providing real-time fully automated incentive-to-needs matching and delivery.

In the example of FIG. 5, the flowchart 500 starts at module 502 where the real-time fully automated incentive provisioning system obtains one or more subscriber roles associated with a subscriber profile. In a specific implementation, the real-time fully automated incentive provisioning system obtains the one or more subscriber roles from a subscriber role generation system based on one or more subscriber profile attributes of the subscriber profile.

In the example of FIG. 5, the flowchart 500 continues to module 504 where the real-time fully automated incentive provisioning system obtains navigation route information. In a specific implementation, the real-time fully automated incentive provisioning system obtains the route information from the subscriber profile stored in the subscriber profile datastore. In other implementations, the real-time fully automated incentive provisioning system obtains the navigation route information from an associated navigation system (e.g., Google Maps, Apple Maps, an automobile navigation system, etc.).

In the example of FIG. 5, the flowchart 500 continues to module 506 where the real-time fully automated incentive provisioning system selects an incentive based on the one or more subscriber roles and the navigation route information.

In the example of FIG. 5, the flowchart 500 continues to module 508 where the real-time fully automated incentive provisioning system provides the incentive to a subscriber system associated with the subscriber profile.

In the example of FIG. 5, the flowchart 500 continues to module 510 where the real-time fully automated incentive provisioning system provides instruction to modify the navigation route information to include a waypoint or other destination associated with the incentive. In a specific implementation, the modification is performed in response to a redemption of the incentive.

Figure 6:
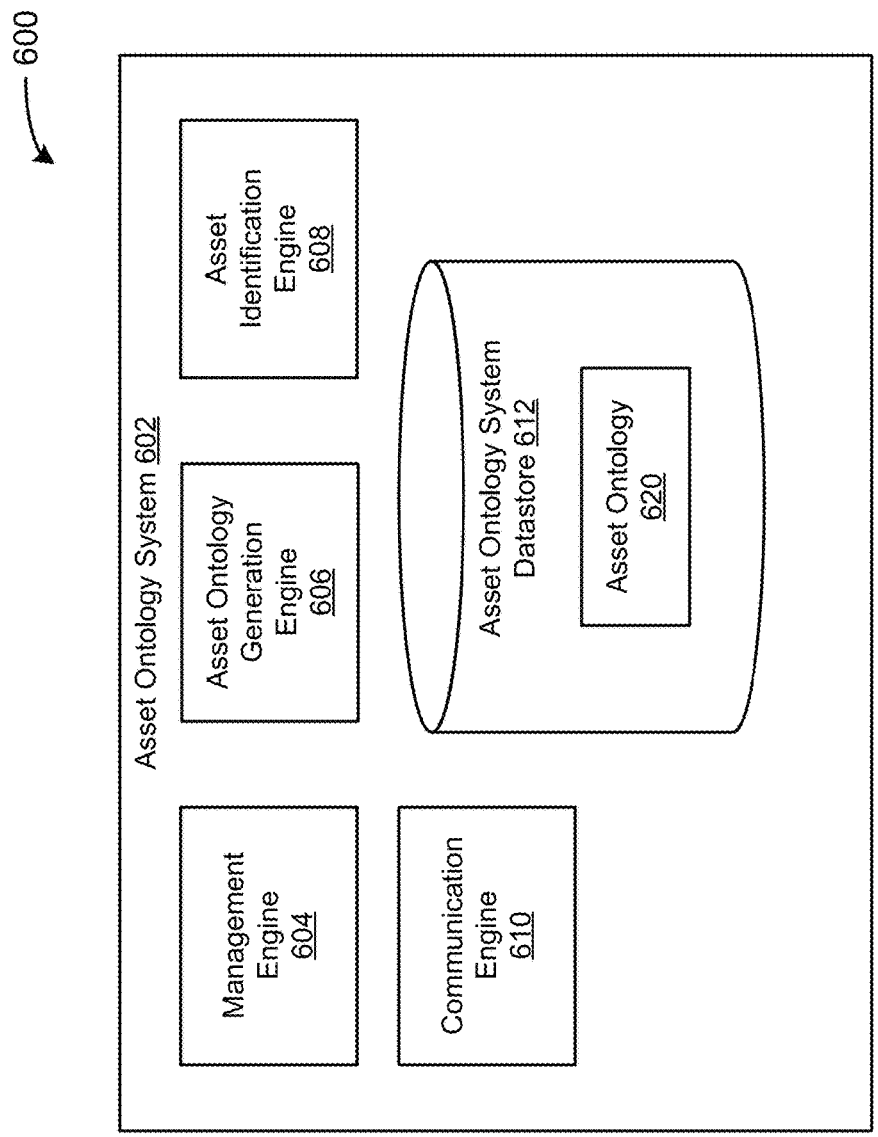
FIG. 6 depicts a diagram of an example of an asset ontology system.

FIG. 6 depicts a diagram 600 of an example of an asset ontology system 602. The asset ontology system 602 includes a management engine 604, an asset ontology generation engine 606, an asset identification engine 608, a communication engine 610, and an asset ontology system datastore 612.

In the example of FIG. 6, the management engine 604 functions to manage (e.g., create, read, update, delete, or otherwise access) asset ontology 620. The management engine 604 may perform any of these operations manually (e.g., by a user interacting with a GUI) and/or automatically (e.g., triggered by one or more of the engines 606-610). Like other engines described herein, some or all of the functionality of the management engine 304 may be included in and/or cooperate with one or more other engines (e.g., engines 606-610).

In the example of FIG. 6, the asset ontology generation engine 606 functions to generate (e.g., create, read, update, delete) the asset ontology 620. In a specific implementation, the asset ontology generation engine 606 generates and stores the asset ontology 620 comprising a weighted node graph. For example, each node can be associated with an asset, a person, a location, a physical description, and the like. Related nodes of the graph can be connected by weighted edges (e.g., the stronger the relationship between nodes, the greater the weight). In a specific implementation, there are multiple types of nodes, such as an "asset" node type and a "non-asset" node type. For example, an asset node type represents an asset (e.g., iPhone 6), and a non-asset node type informs the identification of the one or more assets. For example, a non-asset node "baseball player" may be linked by a weighted edge to an asset node "baseball glove." Non-asset nodes may be matched against subscriber roles, subscriber profiles, and/or attributes thereof, to identify assets based on the links between non-asset nodes and asset nodes. In a specific implementation, the links may be weighted, and an asset can be identified based on a weight threshold. For example, if a link is "weak" (e.g., below the threshold weight), the linked asset may not be identified. Alternatively, if the link is "strong" (e.g., above the threshold weight), the linked asset may be identified. The weight threshold may be specified as part of a campaign, a subscriber profile, a subscriber role, manually set by a merchant account system, and/or the like.

In a specific implementation, the asset ontology 620 is initially generated from seed values (e.g., asset attributes). In various implementations, the initial asset ontology 620 may or may not include any links (or, "edges"). The asset ontology generation engine 606 can progressively update the asset ontology 620 based on logged transactions (e.g., stored in subscriber profiles) and other data to create new nodes and links, and adjust link weights.

In a specific implementation, the asset ontology generation engine 606 functions to dynamically (e.g., in real-time and/or "on-the-fly") create, delete, and/or otherwise modify nodes, links, and/or weights. For example, a transaction can be processed at a point of sale system for a particular product that is not currently represented as an asset in the asset ontology 620. The asset ontology generation engine 606 may look up the asset attributes, and/or generate the asset attributes based on predicted associations with one or more known assets (e.g., based on product name or other attributes), and add a corresponding node to the asset ontology 620. Similarly, weights can be increased and/or decreased. For example, as associations between nodes are strengthened or weakened (e.g., as indicated by subsequent transactions and/or incentive redemptions), the links may be updated to reflect those changes.

In the example of FIG. 6, the asset identification engine 608 functions to identify one or more assets. In a specific implementation, the asset identification engine 608 can identify assets based on traversing the asset ontology 620. For example, the asset identification engine 608 may receive one or more subscriber roles as an input, and traverse the asset ontology 620 based on that input and the characteristics of the asset ontology 620 (e.g., nodes, links, weights).

In the example of FIG. 6, the communication engine 610 to send requests, transmit and, receive communications, and/or otherwise provide communication with one or a plurality of the systems, engines, and/or datastores described herein. In some embodiments, the communication engine 610 functions to encrypt and decrypt communications. The communication engine 610 may function to send requests to and receive data from one or more systems through a network or a portion of a network. Depending upon implementation-specific considerations, the communication engine 610 may send requests and receive data through a connection, all or a portion of which may be a wireless connection. The communication engine 610 may request and receive messages, and/or other communications from associated systems and/or engines. Communications may be stored in the datastore 612.

Figure 7:
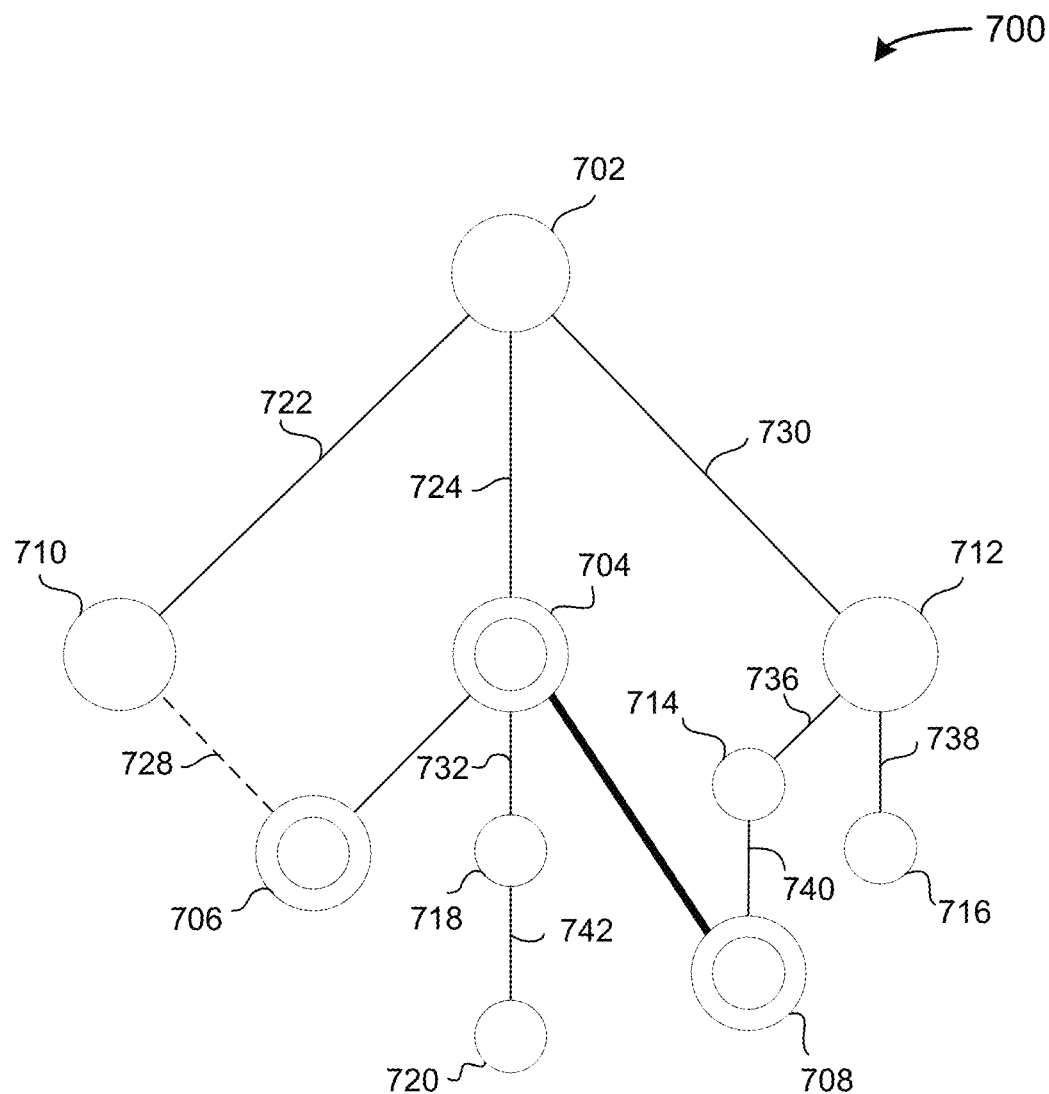
FIG. 7 depicts a diagram of an example of a portion of an asset ontology weighted node graph.

FIG. 7 depicts a diagram 700 of an example of a portion of an asset ontology weighted node graph. The graph includes a root node 702, asset nodes 704-708, non-asset nodes 710-720, and weighted edges 722-742. In a specific implementation, the graph can be traversed based on one more subscriber roles, and/or one or more subscriber profile attributes. In a specific implementation, the dashed edge 728 may represent a weak (e.g., a negative weighting) relationship between nodes 710 and 706, the bold edge 734 represents a strong relationship (e.g., a positive weighting) between nodes 704 and 708, and the remaining edges 730, 732, and 736-742 represent an average relationships (e.g., no weighting) between connected nodes. In various implementations, the graph can be presented graphically to a user (e.g., a merchant). In a specific implementation, the weighted node graph may be viewed through a dashboard or other graphical user interface, and/or manually interacted with (e.g., to adjust weightings, add or removes nodes, and/or the like).

In various embodiments, the asset ontology graph can be progressively updated based on logged transactions and other data to create new nodes and links, and adjust link weights. For example, if a group of subscriber profiles, or a particular subscriber role, include attribute values matching node values of unconnected nodes (e.g., "Runner" and "Gatorade"), then a new link can be created between the nodes.

Figure 8:
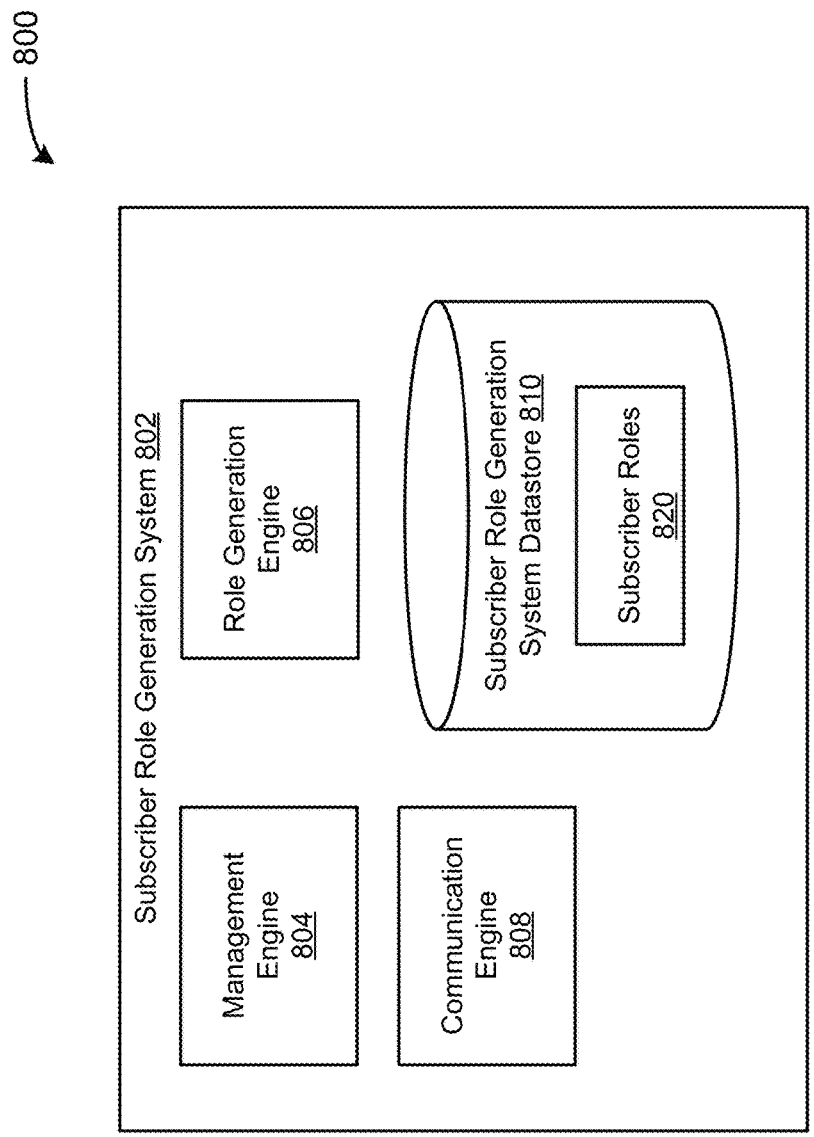
FIG. 8 depicts a diagram of an example of a subscriber role generation system.

FIG. 8 depicts a diagram 800 of an example of a subscriber role generation system 802. The subscriber role generation system 802 includes a management engine 804, a role generation engine 806, a communication engine 808, and a subscriber role generation system datastore 810.

In the example of FIG. 8, the management engine 804 functions to manage (e.g., create, read, update, delete, or otherwise access) subscriber roles 820. The management engine 804 may perform any of these operations manually (e.g., by a user interacting with a GUI) and/or automatically (e.g., triggered by one or more of the engines 806-808). Like other engines described herein, some or all of the functionality of the management engine 804 may be included in and/or cooperate with one or more other engines (e.g., engines 806-808).

In the example of FIG. 8, the role generation engine 806 functions to generate subscriber roles 820. In a specific implementation, subscriber roles 820 define groups of related subscriber profiles, although in other implementations, subscriber roles can be unique to individual subscriber profiles. For example, subscriber profiles can be related based upon corresponding needs, e.g., as identified based on some or all subscriber profile attributes. Subscriber roles can include a variety of attributes, such as geographic attributes, demographic attributes, psychographic attributes, behavioristic attributes, and other attributes that may be used to identify, select, and/or predict incentives that may be of interest to a subscriber or group of subscribers. In a specific implementation, subscriber roles 820 can include some or all of the following attributes:

Subscriber Role Identifier: identifies the subscriber role, e.g., "Bargain Hunter," "Socializer," and/or other human-understandable identifiers.

Geographic Location

Education

Income Level

Marital Status

Special characteristics (e.g., children, pets, hobbies, interests, etc.)

Purchase Tendencies (e.g., spending amounts, shopping locations, etc.)

Incentive Redemption Tendencies (e.g., rarely redeems incentives less provide less than 10% off, but frequently redeems incentives greater than 10% off).

In a specific implementation, the subscriber roles comprise a predetermined set of subscriber roles 820. For example, an administrator can define the subscriber roles 820. In other implementations, the subscriber roles 820 can be dynamically generated. For example, if a threshold number of subscriber profiles have similar values for a particular set of subscriber profile attributes, a subscriber role 820 can be created based on those subscriber profiles.

In the example of FIG. 8, the communication engine 808 to send requests, transmit and, receive communications, and/or otherwise provide communication with one or a plurality of the systems, engines, and/or datastores described herein. In some embodiments, the communication engine 808 functions to encrypt and decrypt communications. The communication engine 808 may function to send requests to and receive data from one or more systems through a network or a portion of a network. Depending upon implementation-specific considerations, the communication engine 808 may send requests and receive data through a connection, all or a portion of which may be a wireless connection. The communication engine 808 may request and receive messages, and/or other communications from associated systems and/or engines. Communications may be stored in the datastore 810.

Figure 9:
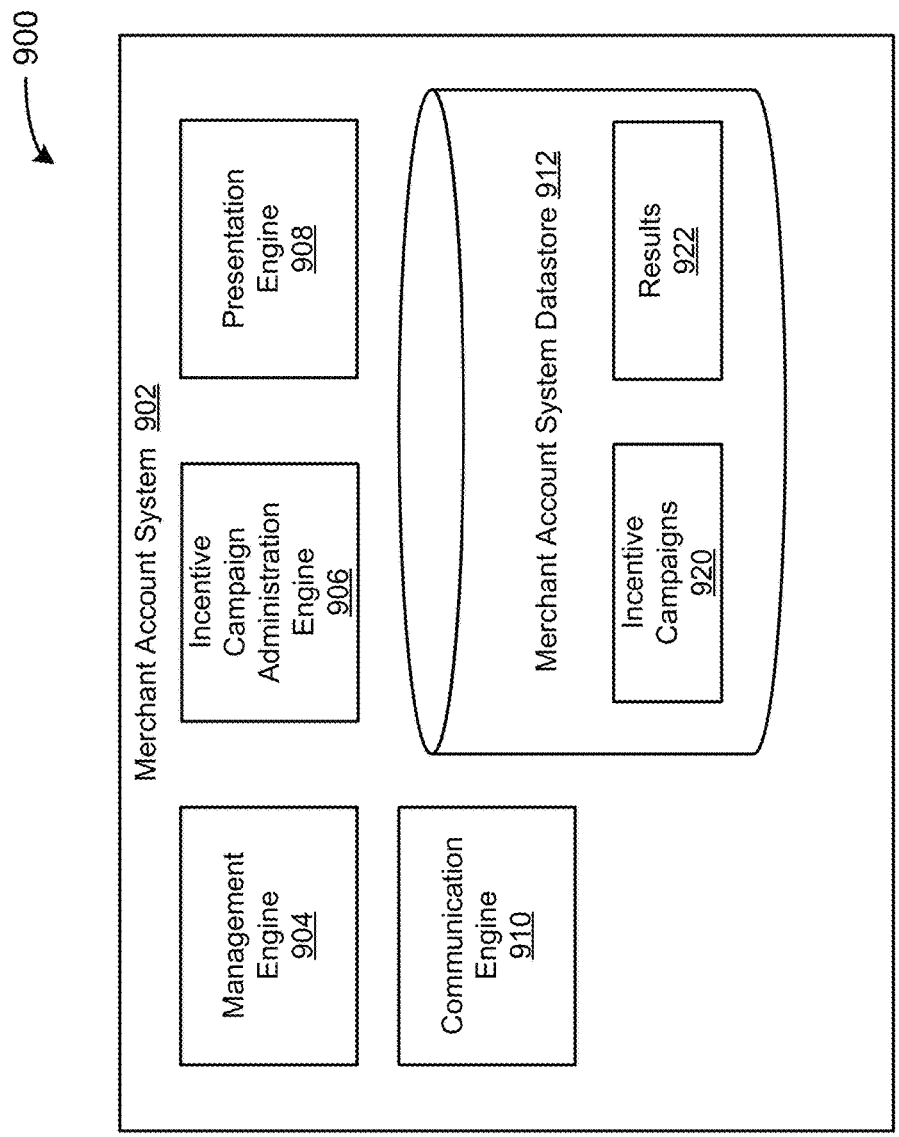
FIG. 9 depicts a diagram of an example of a merchant account system.

FIG. 9 depicts a diagram 900 of an example of a merchant account system 902. The merchant account system 902 includes a management engine 904, an administration engine 906, a presentation engine 908, a communication engine 910, and a merchant account system datastore 912.

In the example of FIG. 9, the management engine 904 functions to manage (e.g., create, read, update, delete, or otherwise access) incentive campaigns 920 and/or related information (e.g., inventive campaign results 922). The management engine 904 may perform any of these operations manually (e.g., by a user interacting with a GUI) and/or automatically (e.g., triggered by one or more of the engines 906-910). Like other engines described herein, some or all of the functionality of the management engine 904 may be included in and/or cooperate with one or more other engines (e.g., engines 906-910).

In the example of FIG. 9, the administration engine 906 functions to administer incentive campaigns. For example, administration engine 906 can provide instructions for defining incentive campaign attributes, viewing incentive campaign results, providing instructions for adjusting incentive campaigns, modifying asset ontology characteristics (e.g., nodes, links, weights) and so forth.

In a specific implementation, the administration engine 906 may receive attribute values which may be used to automatically select a set of incentives for a campaign. For example the administration engine 906 may generate a set of adjustable sliders for setting or receiving attribute values (e.g., between 1 and 10). Attributes can include maximize sales, maximize profit, prevent brand damage, convert new customers to recurring customers, provide incentives to recurring customers, and/or the like. Incentives can be associated with one or more assets (e.g., if an asset is identified, then the associated incentive can be identified).

In the example of FIG. 9, the presentation engine 908 functions to generate dashboards and/or graphical user interfaces (GUIs). In a specific implementation, the presentation engine 908 can generate a dashboard for creating, modifying, and/or viewing incentive campaigns, and or interacting with other engines.

In the example of FIG. 3, the route navigation engine 312 functions to obtain navigation route information (e.g., global positioning information for a vehicle or mobile navigation system). In a specific implementation, the route navigation engine 312 obtains the route information from a subscriber profile stored in a subscriber profile datastore. In other implementations, the route navigation engine 312 obtains the navigation route information from an associated navigation system (e.g., Google Maps, Apple Maps, an automobile navigation system, etc.).

Figure 10:
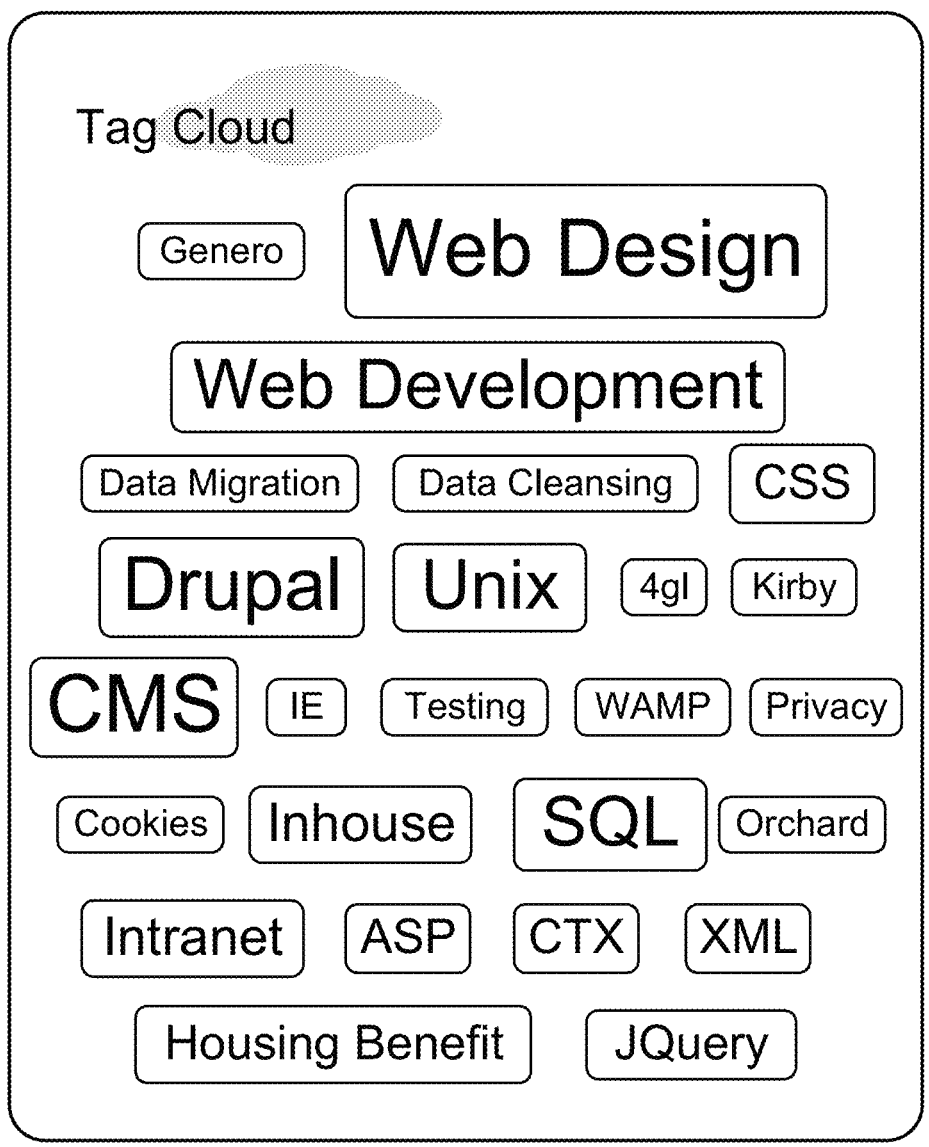
FIG. 10 depicts a diagram of an example merchant account system graphical Interface.

FIG. 10 depicts a diagram 1000 of an example merchant account system graphical interface. In a specific implementation, as shown, the example graphical interface is capable of presenting a cloud of tags. The tags can represent categories of the most frequently purchased or redeemed assets. As shown, a size of the tag can indicate frequency, e.g., the larger the tag, the greater the frequency.

Figure 11:
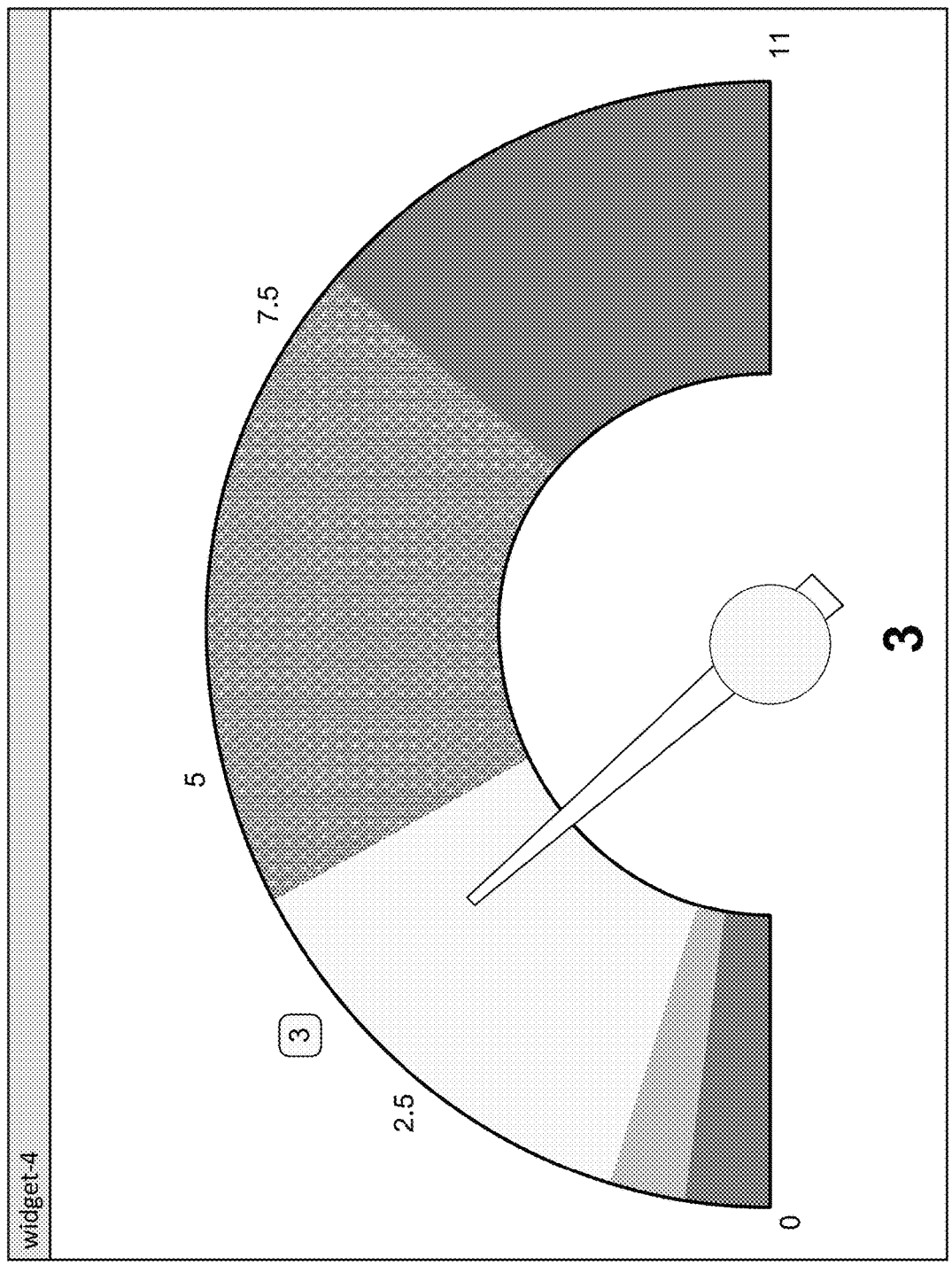
FIG. 11 depicts a diagram of an example merchant account system graphical interface.

FIG. 11 depicts a diagram 1100 of an example merchant account system graphical interface. In a specific implementation, as shown, the example graphical interface can visually indicate subscriber responsiveness to a particular incentive, group of incentives, and/or an incentive campaign.

Figure 12:
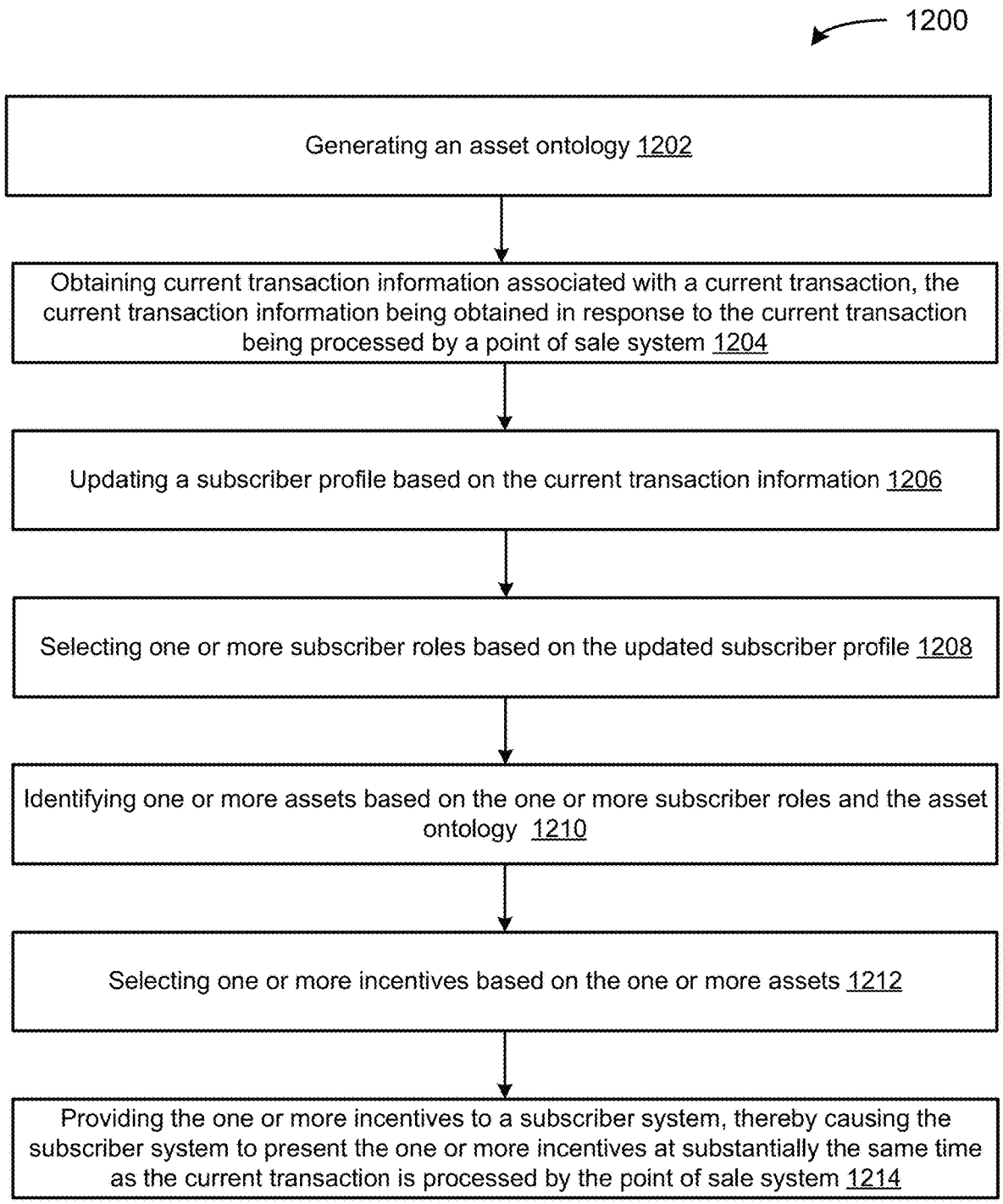
FIG. 12 depicts a flowchart of an example method for providing real-time fully automated incentive-to-needs matching and delivery.

FIG. 12 depicts a flowchart of an example method for providing real-time fully automated incentive-to-needs matching and delivery.

In the example of FIG. 12, the flowchart 1200 starts at module 1202 where an asset ontology system generates an asset ontology. In a specific implementation, the asset ontology system stores the asset ontology in a datastore that can be accessed by one or more remote systems. The asset ontology can be a weighted node graph including one or more asset nodes, one or more non-asset nodes, and at least one weighted link between a particular asset node of the one or more asset nodes and a particular non-asset nodes of the one or more non-asset nodes.

In the example of FIG. 12, the flowchart 1200 continues to module 1204 where a subscriber profile datastore obtains current transaction information associated with a current transaction. In a specific implementation, the subscriber profile datastore can obtain the current transaction information in response to the current transaction being processed by a point of sale system.

In the example of FIG. 12, the flowchart 1200 continues to module 1206 where the subscriber profile datastore updates a subscriber profile based on the current transaction information. In a specific implementation, the subscriber profile datastore can update the subscriber profile in response to obtaining the current transaction information.

In the example of FIG. 12, the flowchart 1200 continues to module 1208 where a real-time fully automated incentive provisioning system selects one or more subscriber roles based on the updated subscriber profile. In a specific implementation, the real-time fully automated incentive provisioning system can select the one or more subscriber roles in response to updating the subscriber profile.

In the example of FIG. 12, the flowchart 1200 continues to module 1210 where the asset ontology system identifies one or more assets based on the one or more subscriber roles and the asset ontology. Assets can include any of one or more products, services, and events. In a specific implementation, the asset ontology system can identify the one or more assets in response to selecting the one or more subscriber roles. The identifying can further include receiving the one or more subscriber roles as input values for the asset ontology, traversing the graph based on the input values, and identifying the one or more assets based on the traversal. In a specific implementation, the asset ontology system can progressively update, based on subsequent transaction information, the asset ontology to include one or more new nodes, new links, and modified link weights.

In the example of FIG. 12, the flowchart 1200 continues to module 1212 where the real-time fully automated incentive provisioning system selects one or more incentives based on the one or more assets. Incentives can include redeemable promotional offers. In a specific implementation, the real-time fully automated incentive provisioning system can select the one or more incentives in response to identifying the one or more assets.

In the example of FIG. 12, the flowchart 1200 continues to module 1214 where the real-time fully automated incentive provisioning system provides the one or more incentives to a subscriber system. In some embodiments, this may causing the subscriber system to present the one or more incentives at substantially the same time as the current transaction is processed by the point of sale system. In a specific implementation, the real-time fully automated incentive provisioning system can provide the one or more incentives in response to selecting the one or more incentives.

For purposes of explanation, numerous specific details are set forth in order to provide a thorough understanding of the description. It will be apparent, however, to one skilled in the art that implementations of the disclosure can be practiced without these specific details. In some instances, systems, modules, engines, structures, processes, features, and devices are shown in block diagram form in order to avoid obscuring the description. In other instances, functional block diagrams and flow diagrams are shown to represent data and logic flows. The components of block diagrams and flow diagrams (e.g., steps, modules, blocks, structures, devices, features, etc.) may be variously combined, separated, removed, reordered, and replaced in a manner other than as expressly described and depicted herein.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the claims recited herein. The techniques described in the preceding text and figures can be mixed and matched as circumstances demand to produce alternative implementations.

The invention claimed is:

1. A point of sale computing system comprising:
   an application programming interface (API);
   one or more processors; and
   memory storing instructions that, when executed by the one or more processors, cause the point of sale computing system to perform:
   generating, via the API, an asset ontology;
   obtaining, via the API, current transaction information associated with a current transaction, the current transaction information being obtained in response to the current transaction being processed by the point of sale computing system;
   updating, via the API in response to the obtaining the current transaction information, a subscriber profile of a plurality of different subscriber profiles based on the current transaction information;
   selecting, via the API in response to the updating the subscriber profile, one or more subscriber roles based on the updated subscriber profile, the one or more subscriber roles being dynamically generated based on a threshold number of subscriber profiles of the plurality of different subscriber profiles having similar subscriber profile values;
   identifying, via the API in response to the selecting the one or more subscriber roles, one or more assets based on the one or more subscriber roles and the asset ontology;
   dynamically generating, via the API in response to the identifying the one or more assets, one or more incentives based on the one or more assets;
   providing, via the API in response to the dynamically generating the one or more incentives, the one or more incentives to a subscriber system, thereby causing the subscriber system to present the one or more incentives at substantially a same time as the current transaction is processed by the point of sale computing system;
   progressively updating, based on subsequent transaction information, the asset ontology to include a plurality of new nodes, a plurality of new links, and a plurality of modified link weights between a particular asset node of one or more asset nodes of the asset ontology and a particular non-asset node of one or more non-asset nodes of the asset ontology.

2. The point of sale computing system of claim 1, wherein the asset ontology comprises a weighted node graph including the one or more asset nodes, the one or more non-asset nodes, and at least one weighted link between the particular asset node of the one or more asset nodes and the particular non-asset node of the one or more non-asset nodes.

3. The point of sale computing system of claim 2, wherein the identifying the one or more assets further includes receiving the one or more subscriber roles as input values for the asset ontology, traversing the weighted node graph based on the input values, and identifying the one or more assets based on the traversal.

4. The point of sale computing system of claim 2, wherein the updating includes:
   progressively updating, based on the subsequent transaction information, the asset ontology.

5. The point of sale computing system of claim 1, wherein the one or more assets include any of one or more products, services, and events.

6. The point of sale computing system of claim 1, wherein the one or more incentives include one or more redeemable promotional offers.

7. The point of sale computing system of claim 1, wherein the instructions further cause the point of sale computing system to perform:
   determining whether the one or more incentives have been redeemed by the subscriber system;
   determining a result of an incentive campaign based on the determining whether the one or more incentives have been redeemed by the subscriber system.

8. A method being implemented by a computing system including one or more physical processors and storage media storing machine-readable instructions, the method comprising:
   generating, via the an application programming interface (API), an asset ontology;
   obtaining, via the API, current transaction information associated with a current transaction, the current transaction information being obtained in response to the current transaction being processed by the computing system;
   updating, via the API in response to the obtaining the current transaction information, a subscriber profile of a plurality of different subscriber profiles based on the current transaction information;
   selecting, via the API in response to the updating the subscriber profile, one or more subscriber roles based on the updated subscriber profile, the one or more subscriber roles being dynamically generated based on a threshold number of subscriber profiles of the plurality of different subscriber profiles having similar subscriber profile values;
   identifying, via the API in response to the selecting the one or more subscriber roles, one or more assets based on the one or more subscriber roles and the asset ontology;
   dynamically generating, via the API in response to the identifying the one or more assets, one or more incentives based on the one or more assets;
   providing, via the API in response to the dynamically generating the one or more incentives, the one or more incentives to a subscriber system, thereby causing the subscriber system to present the one or more incentives at substantially a same time as the current transaction is processed by the computing system;
   progressively updating, based on subsequent transaction information, the asset ontology to include a plurality of new nodes, a plurality of new links, and a plurality of modified link weights between a particular asset node of one or more asset nodes of the asset ontology and a particular non-asset node of one or more non-asset nodes of the asset ontology.

9. The method of claim 8, wherein the asset ontology comprises a weighted node graph including the one or more asset nodes, the one or more non-asset nodes, and at least one weighted link between the particular asset node of the one or more asset nodes and the particular non-asset node of the one or more non-asset nodes.

10. The method of claim 9, wherein the identifying the one or more assets further includes receiving the one or more subscriber roles as input values for the asset ontology, traversing the weighted node graph based on the input values, and identifying the one or more assets based on the traversal.

11. The method of claim 9, wherein the updating includes:
progressively updating, based on the subsequent transaction information, the asset ontology.

12. The method of claim 8, wherein the one or more assets include any of one or more products, services, and events.

13. The method of claim 8, wherein the one or more incentives include one or more redeemable promotional offers.

14. The method of claim 8, further comprising:
determining whether the one or more incentives have been redeemed by the subscriber system;
determining a result of an incentive campaign based on the determining whether the one or more incentives have been redeemed by the subscriber system.

15. A non-transitory computer readable medium comprising instructions that, when executed, cause one or more processors to perform:
generating, via an application programming interface (API), an asset ontology;
obtaining, via the API, current transaction information associated with a current transaction, the current transaction information being obtained in response to the current transaction being processed by the one or more processors;
updating, via the API in response to the obtaining the current transaction information, a subscriber profile of a plurality of different subscriber profiles based on the current transaction information;
selecting, via the API in response to the updating the subscriber profile, one or more subscriber roles based on the updated subscriber profile, the one or more subscriber roles being dynamically generated based on a threshold number of subscriber profiles of the plurality of different subscriber profiles having similar subscriber profile values;
identifying, via the API in response to the selecting the one or more subscriber roles, one or more assets based on the one or more subscriber roles and the asset ontology;
dynamically generating, via the API in response to the identifying the one or more assets, one or more incentives based on the one or more assets;
providing, via the API in response to the dynamically generating the one or more incentives, the one or more incentives to a subscriber system, thereby causing the subscriber system to present the one or more incentives at substantially a same time as the current transaction is processed by the one or more processors;
progressively updating, based on subsequent transaction information, the asset ontology to include a plurality of new nodes, a plurality of new links, and a plurality of modified link weights between a particular asset node of one or more asset nodes of the asset ontology and a particular non-asset node of one or more non-asset nodes of the asset ontology.

16. The non-transitory computer readable medium of claim 15, wherein the asset ontology comprises a weighted node graph including the one or more asset nodes, the one or more non-asset nodes, and at least one weighted link between the particular asset node of the one or more asset nodes and the particular non-asset node of the one or more non-asset nodes.

17. The non-transitory computer readable medium of claim 16, wherein the identifying the one or more assets further includes receiving the one or more subscriber roles as input values for the asset ontology, traversing the weighted node graph based on the input values, and identifying the one or more assets based on the traversal.

18. The non-transitory computer readable medium of claim 16, wherein the updating includes:
progressively updating, based on the subsequent transaction information, the asset ontology.

19. The non-transitory computer readable medium of claim 15, wherein the one or more assets include any of one or more products, services, and events.

20. The non-transitory computer readable medium of claim 15, wherein the one or more incentives include one or more redeemable promotional offers.

* * * * *